(12) United States Patent
McIntyre et al.

(10) Patent No.: US 11,989,723 B2
(45) Date of Patent: May 21, 2024

(54) AFTER-HOURS DEPOSITORY INCLUDING METHOD AND SYSTEM

(71) Applicant: Diebold Nixdorf, Incorporated, North Canton, OH (US)

(72) Inventors: Daniel S. McIntyre, Uniontown, OH (US); Timothy M. Dewell, Fairlawn, OH (US); Steven Davis, North Lawrence, OH (US)

(73) Assignee: Diebold Nixdorf, Incorporated, North Canton, OH (US)

( * ) Notice: Subject to any disclaimer, the term of this patent is extended or adjusted under 35 U.S.C. 154(b) by 819 days.

(21) Appl. No.: 17/074,817

(22) Filed: Oct. 20, 2020

(65) Prior Publication Data
US 2021/0042739 A1 Feb. 11, 2021

Related U.S. Application Data

(63) Continuation-in-part of application No. PCT/US2019/026725, filed on Apr. 10, 2019.

(60) Provisional application No. 62/660,555, filed on Apr. 20, 2018.

(51) Int. Cl.
G06Q 20/38 (2012.01)
G06Q 20/40 (2012.01)
G07C 9/00 (2020.01)

(52) U.S. Cl.
CPC ......... *G06Q 20/382* (2013.01); *G06Q 20/401* (2013.01); *G07C 9/00309* (2013.01)

(58) Field of Classification Search
CPC . G06Q 20/382; G06Q 20/401; G07C 9/00309
See application file for complete search history.

(56) References Cited

U.S. PATENT DOCUMENTS

| | | | |
|---|---|---|---|
| 7,971,782 B1 * | 7/2011 | Shams | G06Q 20/401 235/382 |
| 9,004,353 B1 | 4/2015 | Block et al. | |
| 2008/0283603 A1 * | 11/2008 | Barron | G06K 7/14 235/454 |
| 2011/0251962 A1 * | 10/2011 | Hruska | G06Q 20/4012 705/72 |

(Continued)

OTHER PUBLICATIONS

Gilovich, Cash Security Enclosure, Oct. 1, 1972, IP.com Prior Art Database Technical Disclosure, pp. 1-3 (Year: 1972).*

(Continued)

*Primary Examiner* — Nilesh B Khatri
(74) *Attorney, Agent, or Firm* — Black McCuskey

(57) ABSTRACT

A method for intaking a bag containing currency or bank checks can include receiving, at a first computing device having one or more processors, a first input from a second computing device the defines a pre-staged transaction. The method can also include generating, with the first computing device, a scannable token correlated to the first input and communicated to the second computing device. The method can also include scanning, with a scanner at an after-hours depository (AHD), the scannable token from a display of the second computing device. The method can also include controlling, with a third computing device of the AHD, an actuator to unlock a door of the AHD and receiving the bag through an inlet of a chute of the AHD that extends between the door and a safe of the AHD.

8 Claims, 12 Drawing Sheets

(56) References Cited

U.S. PATENT DOCUMENTS

| | | | | |
|---|---|---|---|---|
| 2014/0166745 A1* | 6/2014 | Graef | ................... | G07F 19/00 |
| | | | | 235/379 |
| 2015/0106261 A1* | 4/2015 | Shmulevsky | ........... | G07F 17/12 |
| | | | | 705/40 |
| 2015/0254653 A1* | 9/2015 | Bondesen | ............ | G06Q 20/385 |
| | | | | 705/41 |
| 2020/0019944 A1* | 1/2020 | Recriwal | .............. | G06Q 20/326 |

OTHER PUBLICATIONS

International Search Authority; International Search Report and Written Opinion; International Application No. PCT/US2019/026725; Sep. 10, 2019; 19 pages.

\* cited by examiner

CREATE A DEPOSIT  VIEW DEPOSITS  VIEW REPORTS  CONTACT

CREATE A NEW DEPOSIT
ACCOUNT
[098566754 ▼]

BAG # [    ] ⊕

CONTENT TYPE      AMOUNT ($)      REFERENCE #
| CASH        |    [    ]        [    ]
| CHECK       |
| FOOD STAMPS |                  (MAX 50 CHARACTERS)
| MIXED       |

⊕ ADD BAG                         ⊕ ADD CONTENT ⊖

[SAVE DEPOSIT]

OUTSIDE DEPOSITS (NOT YET DROPPED)

| ID:      | 00020005744                    | CREATED ON:  | 7/17            | DROP VALUE:     | $585.65 |
| ACCOUNT: | 098566754                      | CREATED BY:  | USER@EMAIL.COM  | NUMBER OF BAGS: | 1       |
| STATUS:  | DROP ENTERED, BUT NOT MADE     |              |                 |                 |         |

FIGURE 5

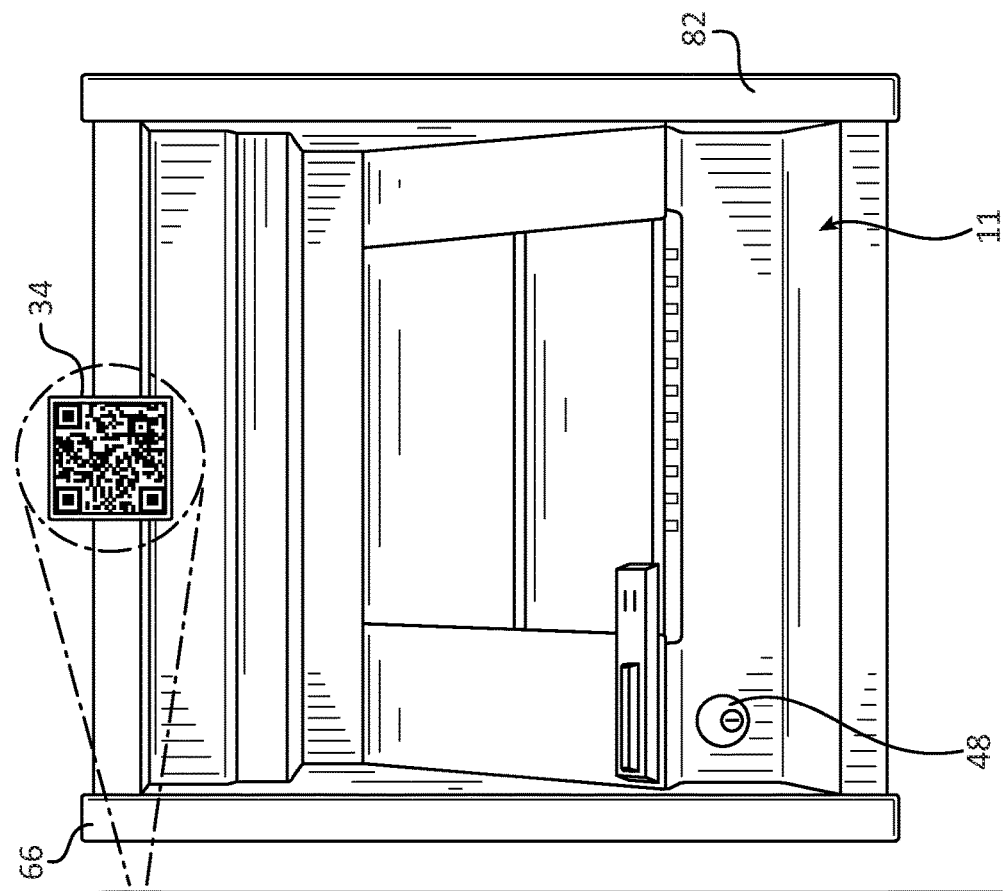
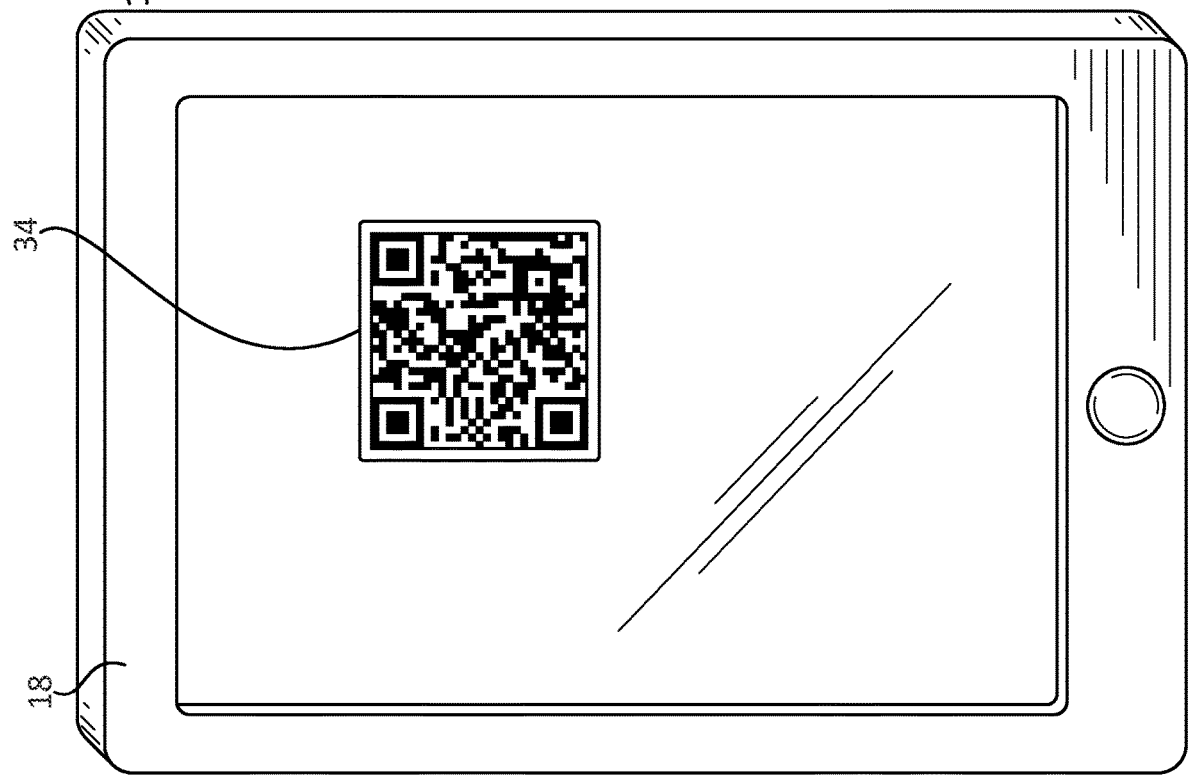
FIGURE 8

 4/28  9:44 AM
FINANCIAL INSTITUTION  <FI@EMAIL.COM>
DEPOSIT DROP NOTIFICATION
TO:  USER@EMAIL.COM
ATTACHMENTS:  DEPOSITDROP-LOCATION.JPG (38 KB)
GOOD DAY, USER
YOUR DEPOSIT BAG # 042817938 WITH CONFIRMATION # 4-8180-0 WAS RECEIVED AT 3-EAST DEMO.
IF YOU HAVE ANY QUESTIONS OR CONCERNS, PLEASE CONTACT YOUR CUSTOMER SERVICE REPRESENTATIVE.
ALL DEPOSITS ARE SUBJECT TO VERIFICATION.
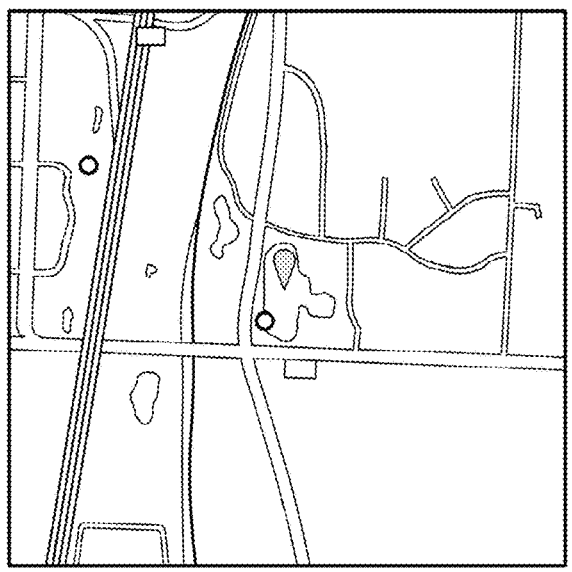
FIGURE 9

AFTER-HOURS DEPOSITORY INCLUDING METHOD AND SYSTEM

CROSS-REFERENCE TO RELATED APPLICATIONS

This application is a continuation-in-part of International Application Ser. No. PCT/US2019/026725, for an AFTER-HOURS DEPOSITORY INCLUDING METHOD AND SYSTEM, filed 2019 Apr. 10, which claimed priority to U.S. Provisional Patent Application Ser. No. 62/660,555 for an AFTER-HOURS DEPOSITORY INCLUDING METHOD AND SYSTEM, filed on 2018 Apr. 20, which is hereby incorporated by reference in its entirety.

BACKGROUND

Field

This relates in general to methods and systems for completing transactions in at an after-hours depository (AHD).

Description of Related Prior Art

An AHD or "night depository" is a drop box at a bank. Merchants can deposit cash and checks, for example, received during the day at the AHD after the bank has closed. The bank will collect deposits made at the AHD and credit them to the respective merchants' accounts, typically on the following business day.

U.S. Pat. No. 9,004,353 discloses a CHECK CASHING AUTOMATED BANKING MACHINE. The automated banking machine is operated at least in part to data read from data bearing records. The machine is operative to carry out a financial transfer responsive at least in part to a determination that data read through a card reader of the machine corresponds to a financial account that is authorized to conduct a transaction through operation of the machine. The machine also includes a check acceptor operative to receive checks from machine users. The check acceptor is operative image checks and data resolved from check images is used in operation of the machine to cause financial transfers.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A method for intaking a bag containing currency or bank checks can include receiving, at a first computing device having one or more processors, a first input from a second computing device. The second computing device can be remote from the first computing device and possessed by a user. The first input can define a pre-staged transaction and can include details of a deposit of the bag. The method can also include generating, with the first computing device, a scannable token in response to the receiving. The scannable token can be correlated to the first input. The method can also include communicating, with the first computing device, the scannable token to the second computing device. The method can also include scanning, with a scanner at an after-hours depository (AHD), the scannable token from a display of the second computing device. The method can also include receiving, by a third computing device having one or more processors at the AHD, from the scanner, the scanned token. The method can also include locking a door of the AHD with a lock that can be operably associated with the door and can be configurable in a first configuration wherein the door is locked in a closed position. The lock can also be configurable in a second configuration wherein the door is unrestrained from moving to an open position from the closed position. The method can also include controlling, with the third computing device, an actuator to switch the lock from the first configuration to the second configuration. The controlling can be in response to the scanning of the scannable token by the scanner. The method can also include receiving, after the controlling, the bag through an inlet of a chute of the AHD that extends between the door and a safe of the AHD. The chute can guide movement of the bag from the door to the safe.

According to other features, controlling the actuator to switch the lock from the first configuration to the second configuration with the third computing device can be further defined as controlling, with the third computing device, the actuator to switch the lock from the first configuration to the second configuration. The controlling can be in response to receiving the scanned token from the scanner and not based on upon approval of switching the lock from the first configuration to the second configuration by the first computing device. The method can also include generating, with the third computing device, two confirmation messages in response to the receiving the bag through the inlet of the chute of the AHD. The generating can include electronically transmitting a first of the two confirmation messages as one of a text message and electronic mail message and/or printing, with a printer of the AHD, a second of the two confirmation messages.

In other features, the method can also include receiving, at the first computing device, a second input from a fourth computing device. The fourth computing device can be remote from the first computing device and possessed by a second user. The second input can define a second pre-staged transaction and include details of a deposit of a second bag containing currency or bank checks. The method can also include generating, with the first computing device, a second scannable token in response to the receiving the second input. The method can also include communicating, with the first computing device, the second scannable token to the fourth computing device. The method can also include scanning, with the scanner at the AHD, the second scannable token from a display of a fifth computing device remote from the first computing device.

According to additional features, the method can also include generating, with the first computing device, a second scannable token that is not correlated to an input received from the second computing device and communicating, with the first computing device, the second scannable token to the second computing device. The method can also include scanning, with the scanner at the AHD, the second scannable token from a display of a fourth computing device remote from the first computing device.

According to other features, the method can also include monitoring for passage of the bag through the chute with a first sensor. The method can also include monitoring the door in both the open position and the closed position with at least one second sensor. The method can also include emitting, with the first sensor, a first signal in response to detection of passage of the bag. The method can also include emitting, with the at least one second sensor, a second signal in response to detection of the door at the open position. The method can also include emitting, with the at least one second sensor, a third signal in response to detection of the door at the closed position. The method can also include generating, with the third computing device, a message to the second computing device in response to receiving the second signal and the third signal without also receiving the first signal.

In other features, the method can also include positioning a physical identifier on the AHD. The physical identifier can include indicia that distinguishes the AHD from other AHDs and is scannable. The method can also include receiving, at the first computing device having one or more processors, a second input indicating that the indicia has been scanned. The scannable token may or may not be correlated to the AHD.

According to additional features, the method can also include receiving, at the first computing device, a second input from the second computing device substantially concurrent with the first input, the second input indicating a current location of the second computing device. The method can also include determining, at the first computing device, one or more locations of AHDs proximate to the current location. The method can also include transmitting, with the first computing device, a message to the second computing device, the message including the one or more locations of AHDs.

A system for intaking a bag containing currency or bank checks can include a first computing device and an after-hours depository (AHD). The first computing device can have one or more processors and can be configured to receive a first input from a second computing device remote from the first computing device and possessed by a user. The first computing device can be further configured to, in response to receiving the first input, generate a scannable token. The first computing device can also be configured to communicate the generated, scannable token to the second computing device. The first input can define a pre-staged transaction and including details of a deposit of the bag. The AHD can be physically remote from the first computing device and include a third computing device, a scanner, a safe, a door, a chute, a lock, and an actuator. The third computing device can have one or more processors. The scanner can be configured to scan the scannable token from a display of the second computing device and also configured to communicate the scanned token to the third computing device. The door can be moveable between an open position and a closed position. The chute can extend between an inlet at the door to an outlet at the safe and can be configured to guide movement of the bag from the door to the safe. The lock can be operably associated with the door and can be configurable in a first configuration wherein the door is locked in the closed position and can also be configurable in a second configuration wherein the door is unrestrained from moving to the open position from the closed position. The actuator can be configured to selectively switch the lock between the first configuration and the second configuration. The actuator can be controlled by the third computing device in response to receiving the scanned token from the scanner.

According to other features, the AHD can also include an outer-facing fascia surrounding the inlet of the chute. The AHD can also include a user-interface assembly including a housing containing the scanner and can be configured to be mounted adjacent to the outer-facing fascia. The user-interface assembly can also include a push button communicating with the third computing device, wherein the push button can communicate a signal to the third computing device when pressed and wherein the third computing device can be configured to activate the scanner in response to receiving the signal from the push button. The user-interface assembly can also include a first indicator configured to emit light when activated, wherein the third computing device can be configured to activate the first indicator in response to receiving the scanned token from the scanner. The system can also include a second indicator that can be configured to emit light when activated, wherein the scanner can be further configured to transmit an error message to the third computing device when the scannable token has not been scanned and wherein the third computing device can be configured to activate the second indicator in response to receiving the error message from the scanner.

In other features, the system can also include a locking cylinder operably associated with the lock in parallel with the actuator, the locking cylinder moveable between a first position wherein the door is locked in the closed position and a second position wherein the door is unrestrained from moving to the open position from the closed position, the locking cylinder configured to receive a key wherein turning the key moves at least part of the locking cylinder between the first position and the second position. The system can also include a first sensor positioned and configured to monitor an interior of the chute for passage of the bag through the chute. The system can also include at least one second sensor positioned and configured to monitor the door in both the open position and the closed position. The first sensor can be configured to emit a first signal in response to detection of passage of the bag. The at least one second sensor can be configured to emit a second signal in response to detection of the door at the open position and emit a third signal in response to detection of the door at the closed position. The third computing device can be configured to generate a message to the second computing device in response to receiving the second signal and the third signal without also receiving the first signal.

BRIEF DESCRIPTION OF THE DRAWINGS

FIG. 5 is a first screen display viewable on the second computing device according to one or more implementations of the present disclosure;

FIG. 8 is a perspective view of a user scanning a quick response code positioned on an AHD according to one or more implementations of the present disclosure;

FIG. 9 is a first screen display viewable on the second computing device according to one or more according to one or more implementations of the present disclosure;

DETAILED DESCRIPTION

Various, particular embodiments of the present disclosure can provide one or more benefits over the art. Embodiments can permit pre-staged transactions at an AHD for increased efficiency. Embodiments can provide a means of proof of deposit at an AHD with an electronic receipt. Embodiments can permit provisional credit for the deposit in a real-time manner. In some embodiments, no network connection may be required. In such embodiments, all communication can occur through software on the user's mobile computing device (an APP).

Additionally, an AHD according to one or more embodiments of the present disclosure can enhance the efficiency of depositing bags in the AHD. For example, the depositor is not required to enter the bank branch to make the deposit. Further, in one or more embodiments of the present disclosure, the bank will have the option to apply provisional credit for deposits. A deposit can be pre-staged and thus (1) associated with a particular account holder and (2) defined by a particular value of funds deposited. The AHD can include appropriate sensors to open upon recognition of a particular pre-staged transaction and to sense the physical deposit of a bag. When this occurs, the account holder can be credited with the deposit before the contents of the deposited bag are removed from the bag.

Figure 1:
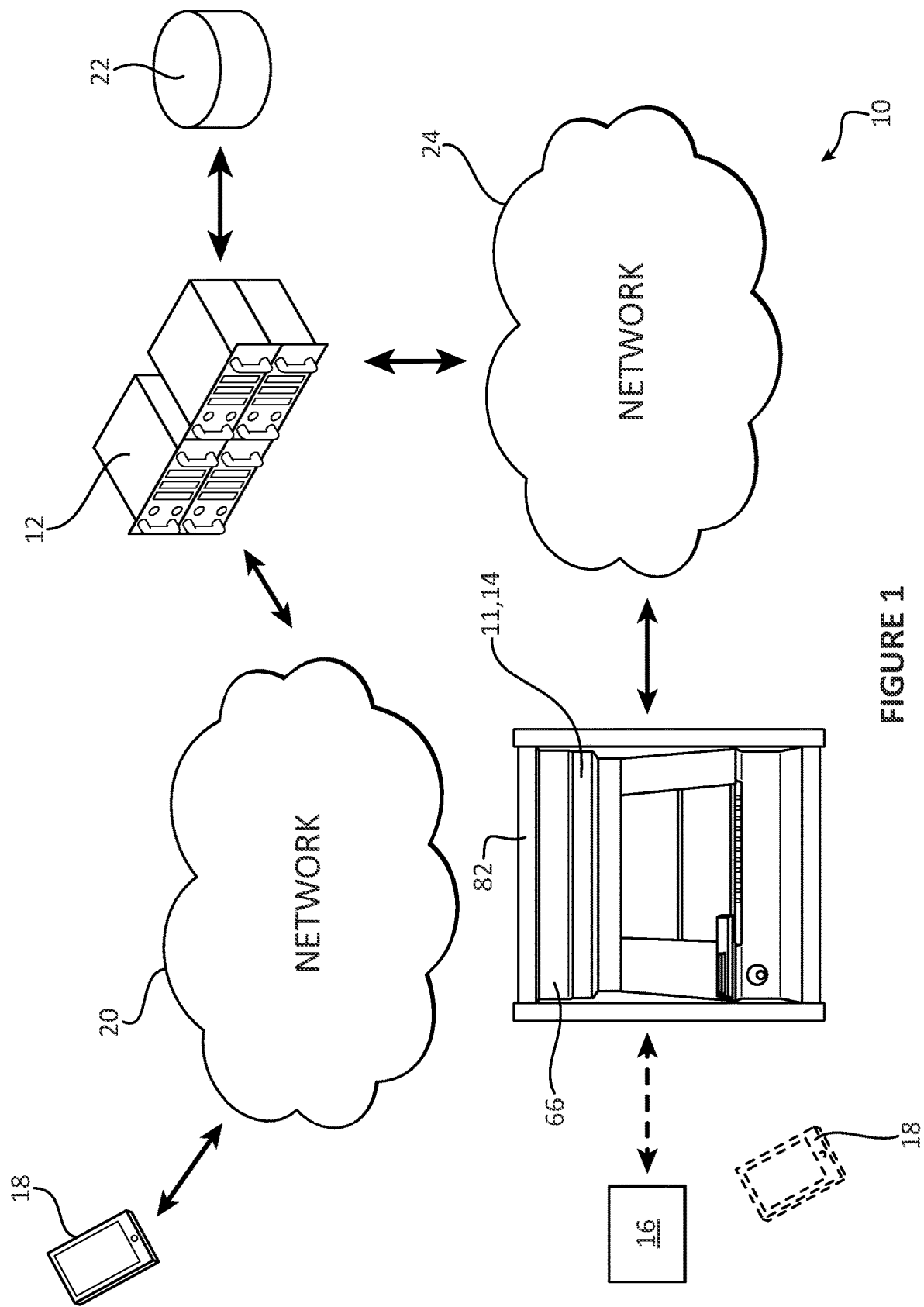
FIG. 1 is a functional block diagram of an exemplary system according to one or more implementations of the present disclosure.

Referring now to the drawings, there is illustrated in FIG. 1 a functional block diagram of an exemplary system according to one or more implementations of the present disclosure. An exemplary system 10 is configured to allow an AHD deposit. The deposit transaction can be pre-staged. The details of the transaction, such as the account and the nature of the deposit, can be provided by the user prior to or upon the user's arrival at the AHD. An exemplary AHD is referenced at 11. A user can be a consumer or a commercial entity.

The exemplary system 10 includes a first computing device 12, a third computing device 14, and a locating marker 16. The exemplary system 10 interacts with a remote, second computing device 18 possessed by a user. The system 10 can be operated by a financial institution and the user can be an account holder of the financial institution.

The exemplary first computing device 12 has one or more processors and a non-transitory, computer readable medium. The first computing device 12 can be a server computing device, such as a server used for financial transactions. The exemplary first computing device 12 is configured to communicate with the remote, second computing device 18 possessed by a user. The first computing device 12 can be configured to communicate with the second computing device 18 over a network 20. The network 20 can include a local area network (LAN), a wide area network (WAN), e.g., the Internet, or any combination thereof. The network 20 can be wireless, wired, or any combination thereof. The network 20 can be, in whole or in part, a cellular phone network. The exemplary first computing device 12 can also access a database 22. The database 22 and the first computing device 12 can be interconnected over a LAN or a WAN.

Figure 2:
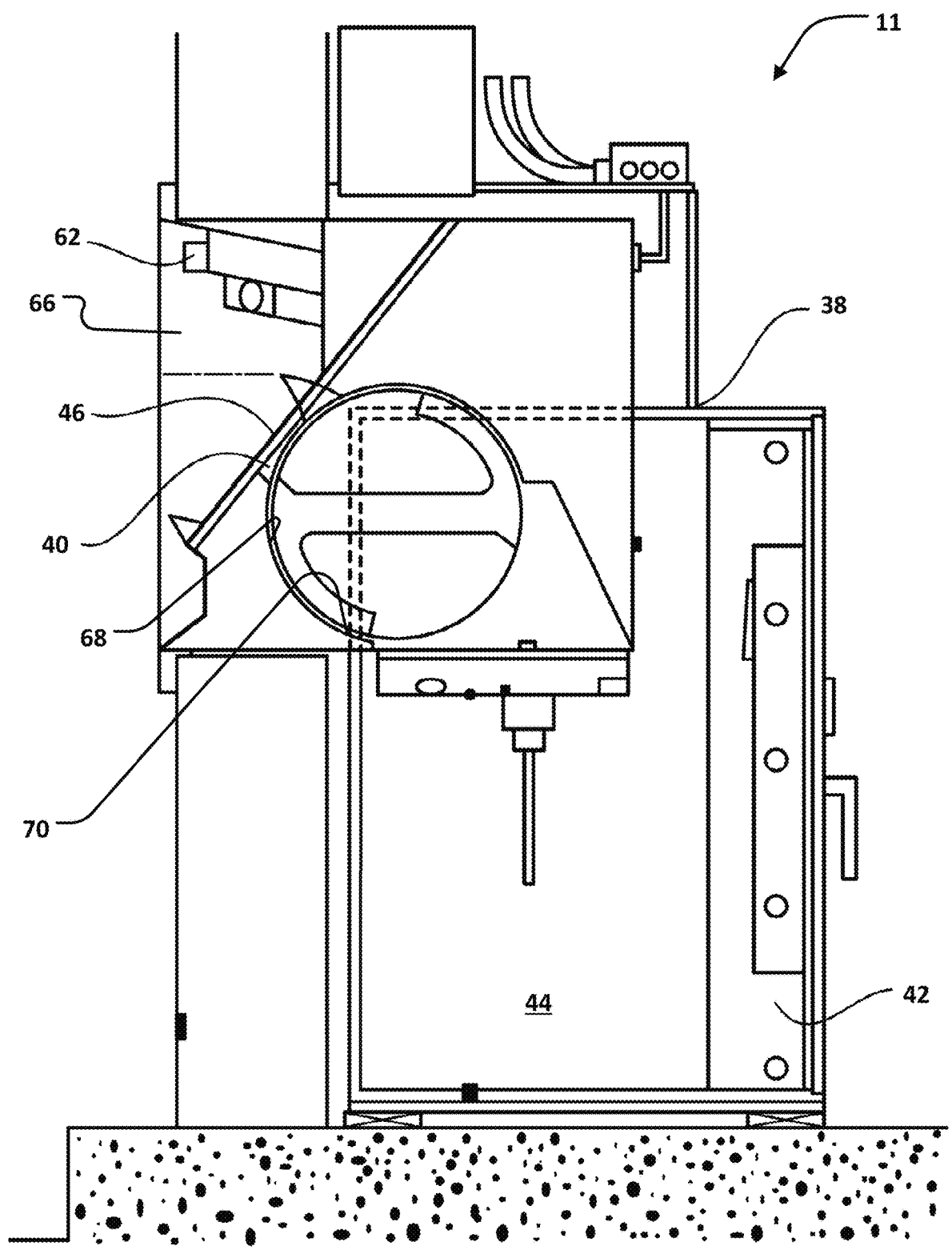
FIG. 2 is a cross-section of a portion of an exemplary AHD according to one or more implementations of the present disclosure.
Figure 3:
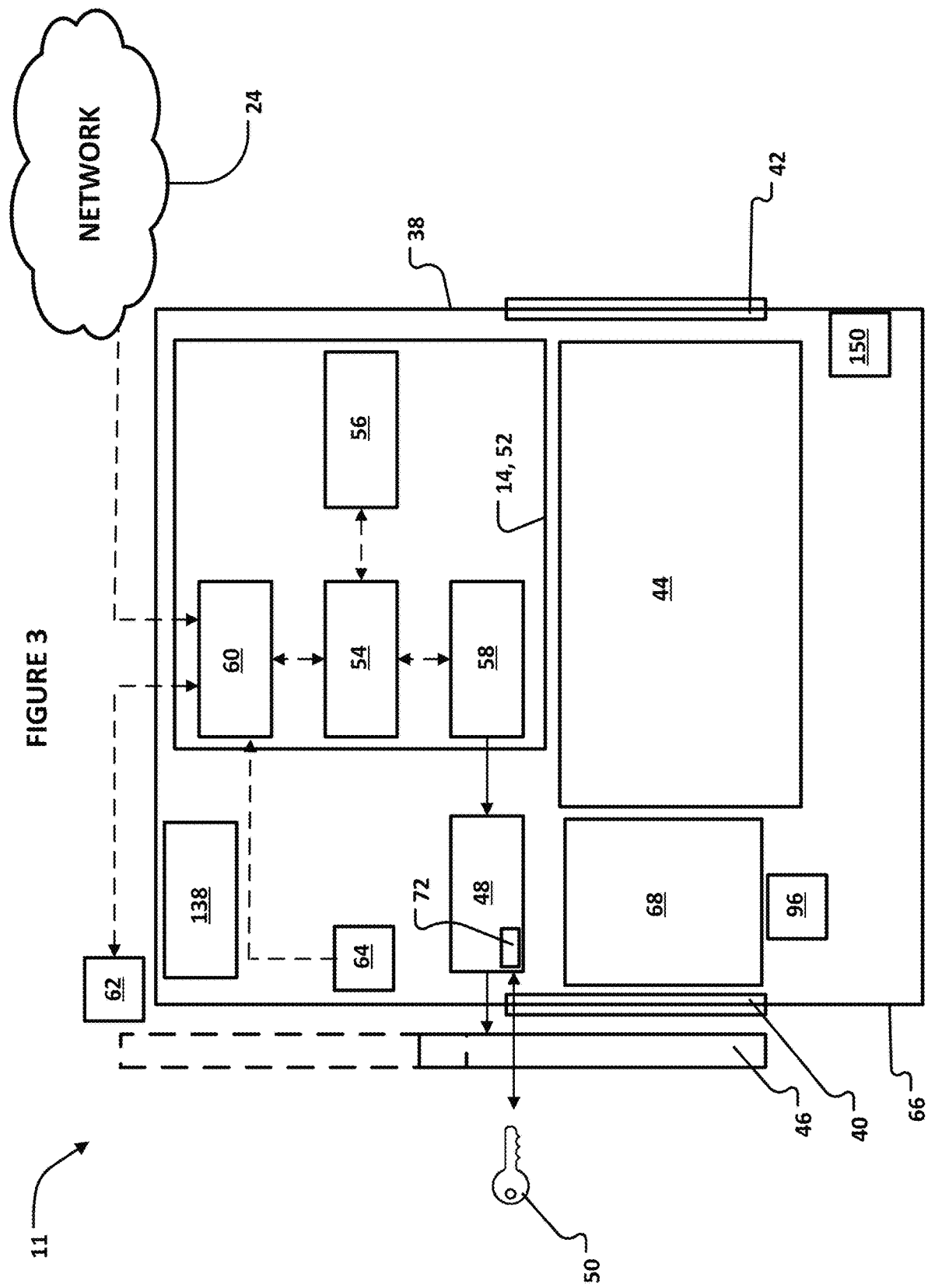
FIG. 3 is a schematic of a portion of the exemplary AHD shown in FIG. 2.

FIGS. 2 and 3 are drawings of the exemplary AHD 11. The AHD 11 includes a housing 38. The housing 38 includes an inlet 40 and an outlet 42. A safe 44 is positioned in the housing 38 and positioned between the inlet 40 and the outlet 42. An exemplary chute 68 extends between the inlet 40 at the door 46 and an outlet 70 feeding into the safe 44. The exemplary inlet 40 of the housing 38 is also the exemplary inlet of the chute 68. The exemplary chute 68 is configured to guide movement of the bag from the door 46 to the safe 44. Deposits are received by the AHD 11 and stored in the safe 44 prior to removal through the outlet 42.

The AHD 11 also includes a door 46 mounted on the housing 38. The housing 38 of the AHD 11 also includes an outer-facing fascia 66 surrounding the door 46 and the inlet 40 of the chute 68. The door 46 is selectively moveable between a first position covering the inlet 40 (a closed position) and a second position spaced from the first position (an open position). In FIG. 3, the door 46 is shown in solid line in the first position and in dashed line in the second position. Deposits can be directed into the housing 38 when the door 46 is in the second position. Deposits are prevented from being directed into the housing 38 by the door 46 when the door 46 is in the first position.

The AHD 11 also includes a lock 48. The lock 48 is configured to operate in a locking configuration and an unlocked configuration. The lock 48 is operably engaged with the door 46 to prevent the door 46 from moving from the first position when in the locking configuration. The lock 48 permits movement of the door 46 from the first position when in the unlocked configuration. The lock 48 includes a locking cylinder that is shown schematically and referenced at 72 in FIG. 3. The locking cylinder 72 includes a keyhole configured to receive a key, such as key 50. The key 50 can be inserted in the locking cylinder 72 of the lock 48 and turned to change the lock 48 between the locking configuration and the unlocked configuration. The locking cylinder 72 moveable between a first position wherein the lock 48 is in the lock configuration and the door 46 is locked in the closed position and a second position wherein the lock 48 is in the unlocked configuration and the door 46 is unrestrained from moving to the open position from the closed position. Turning the key 50 moves at least part of the locking cylinder 72 between the first position and the second position.

The exemplary third computing device 14 is defined by a mobile interface unit 52 of the AHD 11. The mobile interface unit 52 is positioned proximate to the housing 38. The mobile interface unit 52 can be positioned in the housing 38 or next to the housing 38. The mobile interface unit 52 has one or more processors (referenced by a controller 54) and a non-transitory, computer readable medium for memory 56. Exemplary controller 54 includes at least one microprocessor coupled to memory 56. The memory 56 can include random access memory (RAM) devices comprising the main storage for controller 54, as well as any supplemental levels of memory, e.g., cache memories, non-volatile or backup memories (e.g., programmable or flash memories), read-only memories, etc. The memory 56 may be considered to include memory storage physically located in controller 54, e.g., any cache memory in a processor in CPU, as well as any storage capacity used as a virtual memory, such as stored on a mass storage device or on another computer or electronic device coupled to controller 54. Memory 56, in other implementations, may also include one or more mass storage devices, e.g., a floppy or other removable disk drive, a hard disk drive, a direct access storage device (DASD), an optical drive (e.g., a CD drive, a DVD drive, etc.), and/or a tape drive, among others.

Controller 54 operates under the control of an operating system, kernel and/or firmware and executes or otherwise relies upon various computer software applications, components, programs, objects, modules, data structures, etc. Moreover, various applications, components, programs, objects, modules, etc. may also execute on one or more processors in another computer coupled to controller 54, e.g., in a distributed or client-server computing environment, whereby the processing required to implement the functions of a computer program may be allocated to multiple computers over a network.

The exemplary mobile interface unit 52 also includes an actuator 58 operably engaged with the lock 48. The controller 54 is configured to control the actuator 58. The controller 54 can control the actuator 58 to change the lock 48 between the locking configuration and the unlocked configuration. The exemplary locking cylinder 72 operably associated with the lock 48 in parallel with the actuator 58. The actuator 58 can be configured to selectively switch the lock 48 between the first configuration and the second configuration.

The exemplary mobile interface unit 52 includes a transceiver 60. The transceiver 60 is configured to receive and transmit wireless and/or wired communications. The transceiver 60 can be in direct communication with both the first computing device 12 and the user computing device 18. Alternatively, the transceiver 60 can be in direct communication with first computing device 12 and in indirect communication with the user computing device 18. Alternatively, the transceiver 60 can be in direct communication with second computing device 18 and in indirect communication with the first computing device 12. The transceiver 60 can transmit messages originating from the controller 54 to other computing devices such as the first computing device 12 and the user computing device 18. The transceiver 60 can receive messages from the first computing device 12 and the user computing device 18 and direct the received messages to the controller 54.

The first computing device 12 and the third computing device 14 can communicate with one another over a network 24 (referenced in FIG. 1). The network 24 can be a WAN. It is noted that the exemplary network 24 can be more secure than the exemplary network 20. However, it is noted that in one or more alternative embodiments of the present disclosure the first computing device 12 and the third computing device 14 can communicate with one another over the network 20.

The exemplary locating marker 16 is positioned at the AHD 11 at the exchange location, which is remote from the first computing device 12. The exemplary locating marker 16 is configured to convey details of the exchange location. For example, the locating marker 16 can include a quick response (QR) code. The QR code can be scanned with the second computing device 18 by the user when the user is positioned proximate to the AHD 11. The scanning of the QR code can be completed through an APP at least partially controlled by the financial institution, such as a mobile banking APP. In response to scanning the QR code, the second computing device 18 can be controlled by the APP to transmit the exchange location to the first computing device 12.

In another non-limiting embodiment, the locating marker 16 can include a near field communication (NFC) device. An exemplary NFC device is referenced at 62 in FIGS. 2 and 3. The NFC device can communicate with the second computing device 18 when the user is proximate to the AHD 11. The NFC device can be a "dumb" NFC device that can transmit details of the exchange location when the user taps the second computing device 18 on the NFC device. Upon receipt of the exchange location, the second computing device 18 can transmit the details of the exchange location to the first computing device 12 as well as the account associated with the user. Alternatively, the NFC device can be a "smart" NFC device that can receive details of the user's account from the second computing device 18 when the user taps the second computing device 18 on the NFC device and transmit those details to the controller 54. The controller 54 can then transmit those details to the first computing device 12.

It is noted that a QR code and an NFC device are presented as examples and are not limiting on the present disclosure. For example, in another non-limiting embodiment, the locating marker 16 can include one or more Bluetooth® beacons. The one or more Bluetooth® beacons can communicate with the second computing device 18 when the user is in the drive-through lane. As with the NFC device, the communication between the second computing device 18 and the Bluetooth® beacons can involve the second computing device 18 receiving data of the exchange location and transmitting the data to the first computing device 12 as part of an input or the one or more Bluetooth® beacons receiving the account from the second computing device and communicating the data to the third computing device 14. In another non-limiting embodiment, the locating marker 16 can include geo-fencing. For example, the geo-fencing can be utilized with a banking APP on the second computing device 18. In another non-limiting embodiment, the locating marker 16 can include structures for biometric identification. Fingerprint or facial recognition are two examples of such identification. In another non-limiting embodiment, the locating marker 16 can include magnetic coupling, such as disclosed in EP0598528A2.

Figure 4:
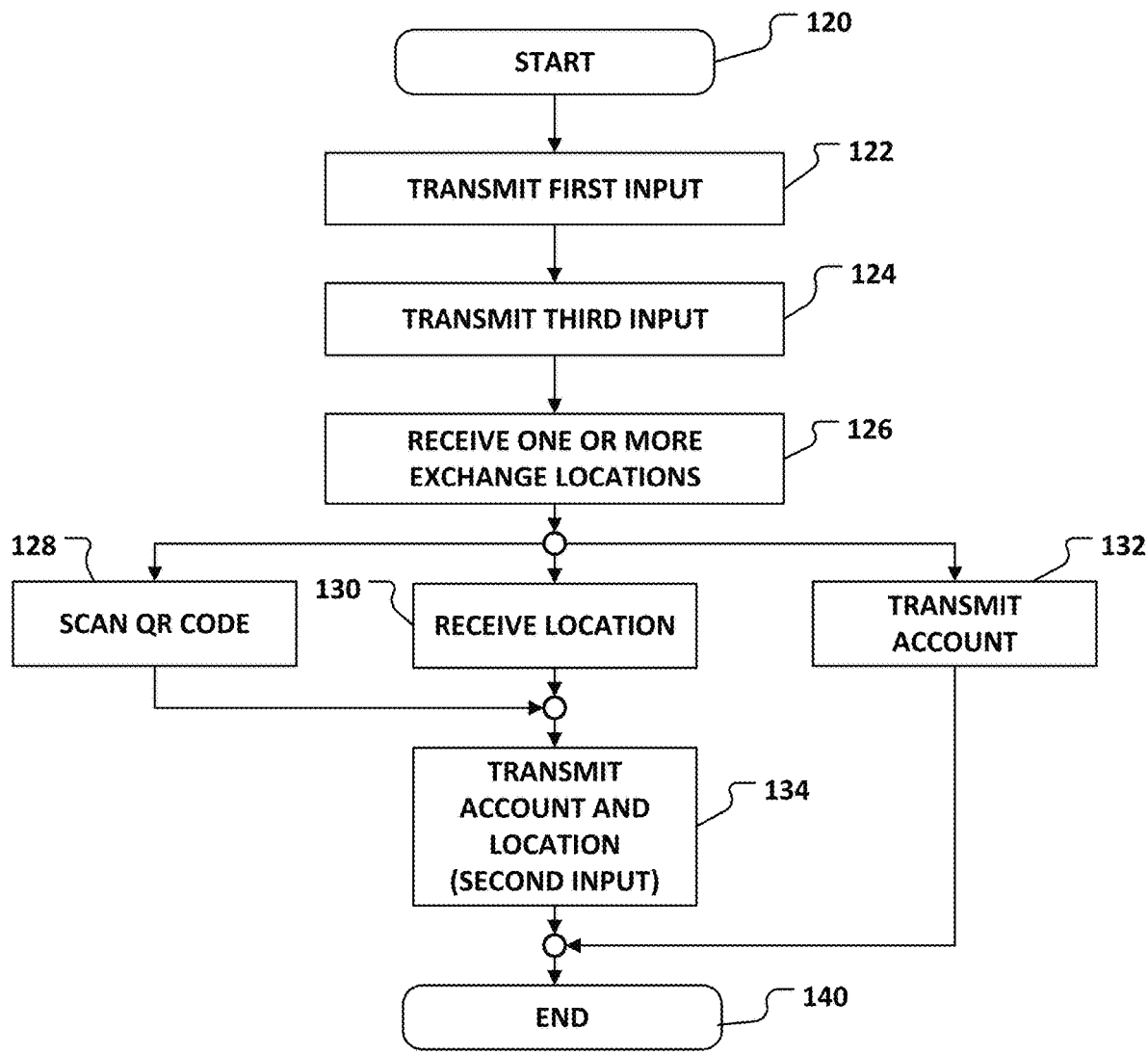
FIG. 4 is a flow diagram of an exemplary method executed by a second computing device according to one or more implementations of the present disclosure.
Figure 6:
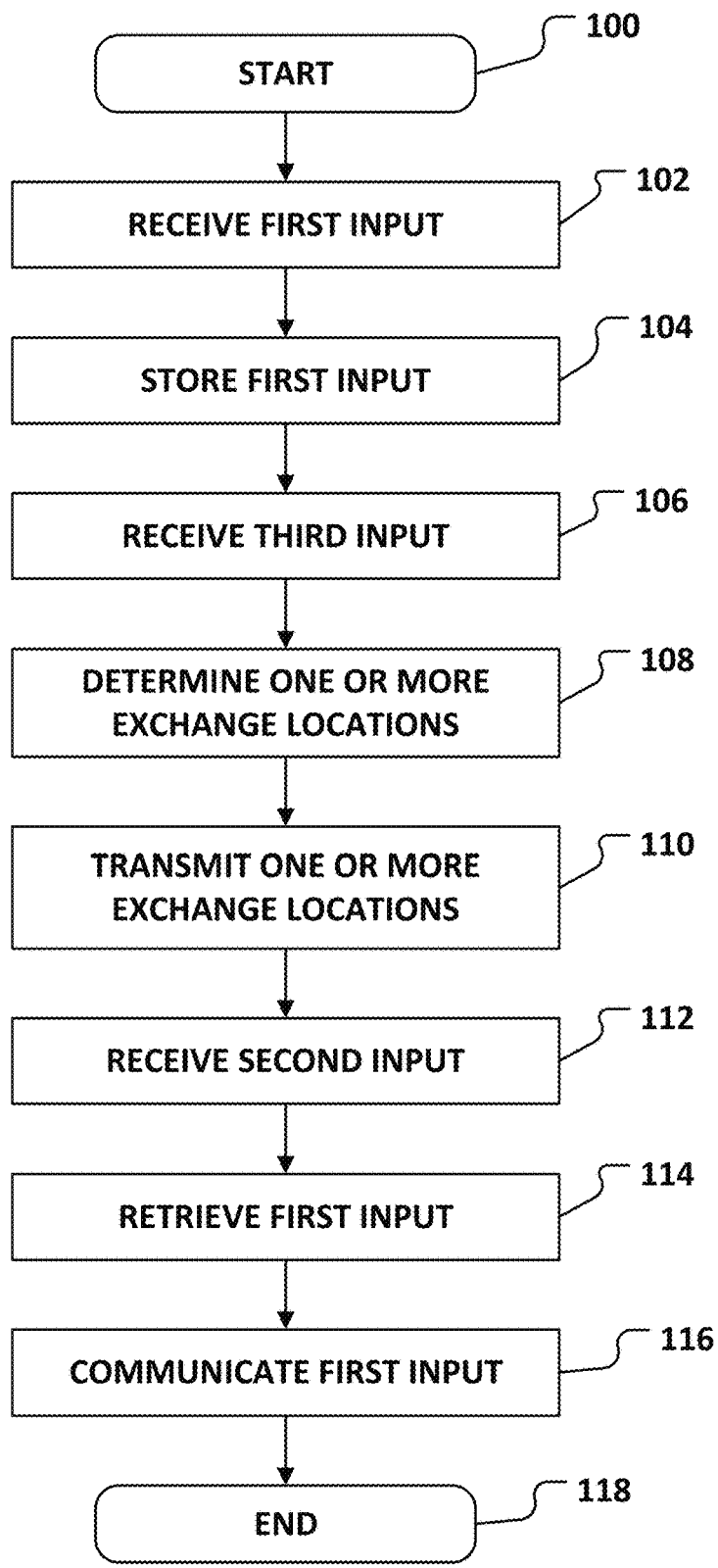
FIG. 6 is a flow diagram of an exemplary method executed by a first computing device according to one or more implementations of the present disclosure.
Figure 7:
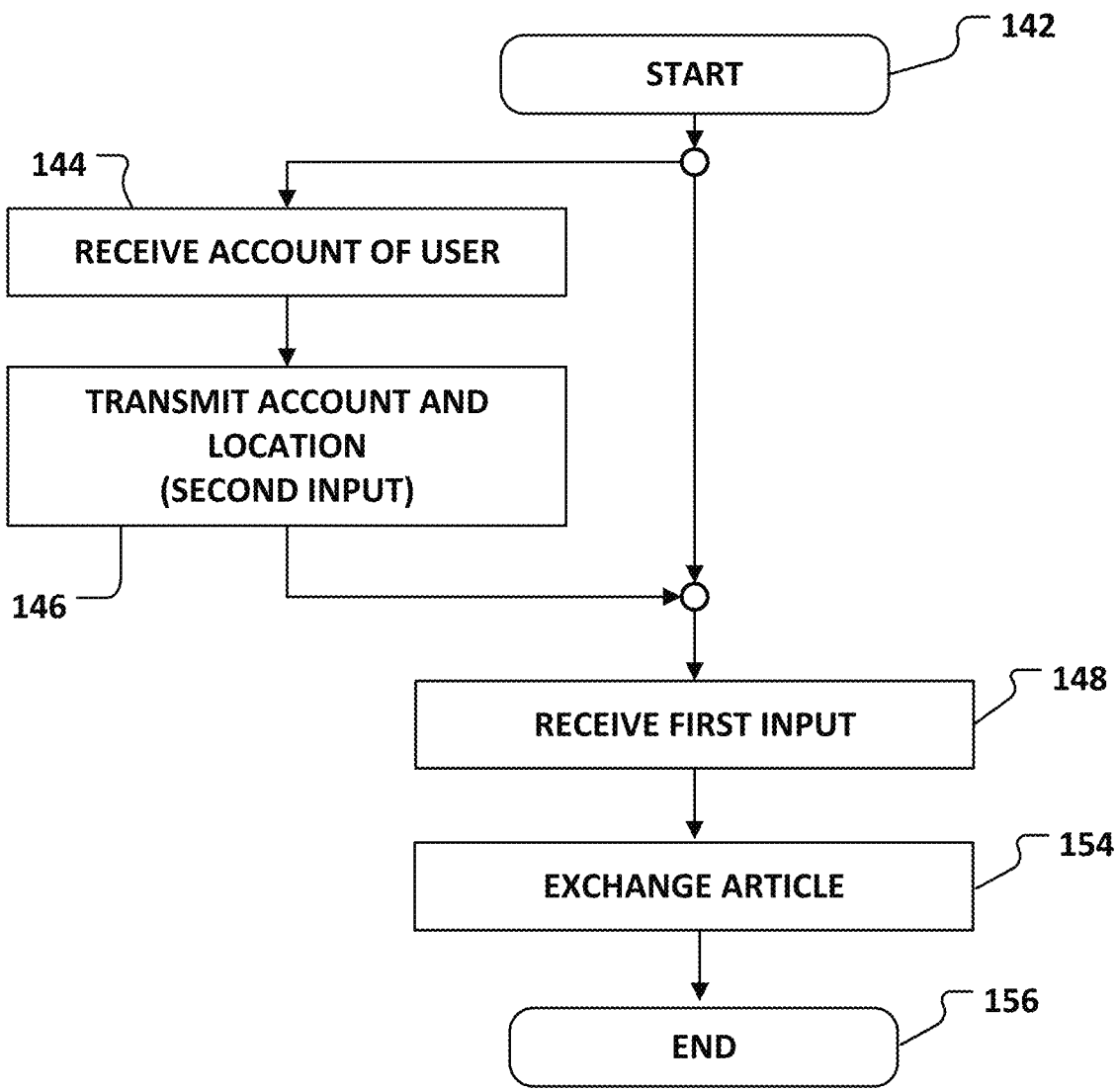
FIG. 7 is a flow diagram of an exemplary method executed by a third computing device according to one or more implementations of the present disclosure.

In operation, the system 10 can execute a method for linking a pre-staged banking transaction with an AHD 11. FIGS. 4, 6 and 7 are flow diagrams of exemplary actions of the various computing devices. FIG. 4 is a flow diagram of an exemplary method executed by the second computing device 18 according to one or more implementations of the present disclosure and starts at 120. FIG. 6 is a flow diagram of an exemplary method executed by the first computing device 12 according to one or more implementations of the present disclosure and starts at 100. FIG. 7 is a flow diagram of an exemplary method executed by the third computing device 14 according to one or more implementations of the present disclosure and starts at 142.

As shown in FIG. 4 at 122, the second computing device 18 can generate and transmit a first input. The first input is indicative of a pre-staged transaction, such as the deposit of checks and or currency at an AHD. The second computing device 18 can be executing an APP at least partially controlled by the financial institution, such as a mobile banking APP, when the first input is generated and transmitted. The user can use the APP to initiate the first input and send the first input through the second computing device 18. The first input can include details of an exchange of at least one physical article that will be performed after the first input is received. The details of the exchange can include the nature of the exchange and the value or amount of the exchange.

For example, the physical article can be a check and the exchange can be the depositing of the check of some amount in an AHD, such as AHD 11, by the user.

FIG. 5 is an exemplary screen that can be displayed to the user on the second computing device 18 when utilizing the banking APP. The screen can be displayed to allow the user to generate the first input. The user is permitted to specify an account, distinguish among a plurality of bags that will be deposited, identify the content of each bag, amounts, and designate a reference number internal to the user. Previously scheduled, but pending deposits are also shown to the user. The selections made in this screen are sent to the first computing device 12 as the first input.

Referring now to FIG. 6, at 102, the first computing device 12 can receive the first input. The exchange location is unknown to the first computing device 12 when the first input is received, in one or more implementations of the present disclosure. Thus, the precise AHD from among a plurality of AHDs including AHD 11 is unknown to the first computing device 12 when the first input is received in one or more implementations of the present disclosure. The first input is stored in the database 22 by the first computing device 12 at 104.

The first computing device 12 can optionally assist the user in determining the exchange location. At 124 in FIG. 4, the second computing device 18 can transmit a third input that is received by the first computing device 12, as shown at 106 in FIG. 6. The third input can indicate a current location of the user. The mobile banking APP operating on the second computing device 18 can be configured to access the GPS data retained in the second computing device 18 and transmit that data to the first computing device 12 with the first input. The third input can thus be transmitted substantially concurrent with the first input. In response to receiving the third input, the first computing device 12 can determine one or more possible exchange locations proximate to the current location. For example, a look-up table or listing of the geographical locations of available AHDs can be stored in the database 22 and the first computing device 12 can access the database 22. Based on the current location, at 108, the first computing device 12 can determine AHDs proximate to the user from the database 22. At 110 in FIG. 7, the first computing device 12 can transmit one or more locations for consideration by the user over the network 20. The locations are received by the second computing device 18, as shown at 126 in FIG. 4.

The mobile banking APP operating on the second computing device 18 can cause the one or more possible exchange locations to be displayed on the second computing device 18. The user can select one by pressing the desired exchanged location. The mobile banking APP can then access a map/directions APP on the second computing device 18 and cause directions to be displayed to the user.

When the user arrives at the AHD 11, a second input can be generated to continue the exchange. In one embodiment of the present disclosure, the second input is generated by the second computing device 18 without data from the third computing device 14. The second input can thus originate from the second computing device 18. For example, a physical object can be positioned in the AHD 11 at the exchange location. The physical object can be the locating marker 16, such as a QR code 34. Generation of the second input can begin when the user arrives at the AHD 11 and scans the QR code 34 with the second computing device 18, as referenced at 128 in FIG. 4. The data represented by the QR code 34 can include the data associated with the exchange location and/or the AHD 11. The mobile banking APP operating on the second computing device 18 can control the scanning operation and transmit the second input over the network 20. As noted above, in other implementations of the present disclosure, different approaches can be applied to determine when the user has arrived at the exchange location, including Bluetooth® beacons, geofencing, biometric devices, and magnetic coupling. As shown in FIG. 4 at 134, the second computing device 18 can generate and transmit the second input. The third computing device 14 can thus be bypassed relative to the second input. The second computing device 18 can transmit the second input over a network that is at least partially wireless.

In another embodiment of the present disclosure, the second input is generated by the second computing device 18 with data from the third computing device 14 and the second input originates from the second computing device 18. Referring now to FIG. 4, at 130, the second computing device 18 can receive location data for generating the second input. The exemplary NFC device 62 can define the locating marker 16 and be positioned on the AHD 11. The exemplary NFC device 62 can be configured to emit a signal including the exchange location. The user can "tap" the NFC device 62 with the second computing device 18. During proximity between the NFC device 62 and the second computing device 18, the NFC device 62 can transmit a signal to the second computing device 18. The signal can include the exchange location (the location of the AHD 11 or a number associated with the specific AHD 11). The second computing device 18 can be operating the mobile banking APP during this process. The mobile banking APP can act in response to the signal received from the NFC device 62 by packaging the location data from the signal with the account associated with the user to generate and transmit the second input. As shown in FIG. 4 at 134, the second computing device 18 can generate and transmit the second input.

In another embodiment of the present disclosure, the second input is generated by the third computing device 14 with data received from the second computing device 18. Referring now to FIG. 4, at 132, the second computing device 18 can transmit account data for generating the second input. The NFC device 62 positioned on the AHD 11 can be configured to receive data. The user can tap the NFC device 62 with the second computing device 18 and, during proximity between the NFC device 62 and the second computing device 18, the NFC device 62 can receive a signal from the second computing device 18. The signal can include the account associated with the user as referenced at 132 in FIG. 4. The second computing device 18 can be operating the mobile banking APP during this process. The mobile banking APP can act on the signal received from the NFC device 62 requesting the account data and respond with the requested data. The NFC device 62 can direct the account data to the mobile interface unit 52 (the third computing device 14). The mobile interface unit 52 can receive the account data as referenced at 144 in FIG. 7. The mobile interface unit 52 can retain in memory 56 the exchange location data, package the exchange location data with the account associated with the user, and transmit the second input directly to the first computing device 12, as referenced at 146 in FIG. 7. In this embodiment, the second input is at least partially received from the second computing device 18 at the exchange location since part of the data of the second input is received from the second computing device 18. The account associated with the user is received by the first computing device 12 indirectly from the second computing device 18, through the mobile interface unit 52 at the exchange location.

Referring now to FIG. 6, at 112, the first computing device 12 can receive the second input. As set forth above, the second input can include the identity of the user and data associated with the AHD 11 at the exchange location. The data can be the geographic location of the AHD 11 or can be some other value uniquely associated with the AHD 11 such that the first computing device 12 can identify the AHD 11 from among a plurality of AHDs.

The first computing device 12 can retrieve the first input at 114 in response to receiving the second input at 112. The first input can be retrieved from the database 22. The first computing device 12 can communicate at least part of the first input to the third computing device 14 (the mobile interface unit 52) in response to the receiving the second input, as referenced at 116 in FIG. 6. In embodiments in which the second input has been received by the first computing device 12 from the second computing device 18, the first computing device 12 can transmit all of the first input. In embodiments in which the second input has been received by the first computing device 12 from the third computing device 14, the first computing device 12 can transmit part of the first input. In such embodiments, the third computing device 14 has already obtained the account associated with the user.

As shown in FIG. 7, the third computing device 14 can receive the first input (or the portion of the first input) at 148. As shown in FIG. 6, after 116 the exemplary actions of the first computing device 12 end at 118. The third computing device 14 can exchange the at least one physical article with the user in response to the receiving the first input from the first computing device 12, as referenced at 154. The third computing device 14 can receive the at least one physical article from the user, such as a check or cash for deposit.

The exemplary processes set forth in FIGS. 4 and 7 respectively end at 140 and 156.

In one example, in one or more embodiments of the present disclosure, in response to receipt of the first input, the mobile interface unit 52 can control the lock 48 to switch to the unlocked configuration allowing the door 46 to open. Thus, the door 46 can be opened without the key 50. When the door 46 opens, the user can place a deposit in the AHD 11, completing the transaction. The AHD 11 can include a sensor 64 positioned and configured to sense when the doo 46 is in the closed or open positions. The sensor 64 can communicate with the controller 54 through the transceiver 60. When the door 46 returns to the closed position, the mobile interface unit 52 can control the lock 48 to switch to the locking configuration.

When the controller 54 controls the lock 48 to switch to the locking configuration in response to a signal from the sensor 64 indicating that the door 46 is in the closed position, the controller 54 can also communicate a fourth input to the first computing device 12. The fourth input is indicative of completion of the pre-staged transaction. In response to receiving the fourth input, the first computing device 12 can transmit a message to the second computing device 18.

FIG. 9 is an exemplary screen that can be displayed to the user on the second computing device 18 when utilizing the banking APP. The screen can be displayed to allow the user to receive and review details of confirmation of the transaction. A number associated with the transaction, a confirmation number for the transaction, and a location of the transaction are displayed to the user. Further, a map displaying the location of the transaction is displayed.

In some embodiments of the present disclosure, no network connection between the first computing device 12 and the mobile interface unit 52 may be required. In such embodiments, all communication can occur through software on the user's mobile computing device (the banking APP). The second computing device 18 can receive an input from the first computing device 12 indicative of a command for the lock 46 to switch to the unlocked configuration. This input can be transmitted from the second computing device 18 to the controller 54 through the NFC device 62 and the transceiver 60.

Figure 10:
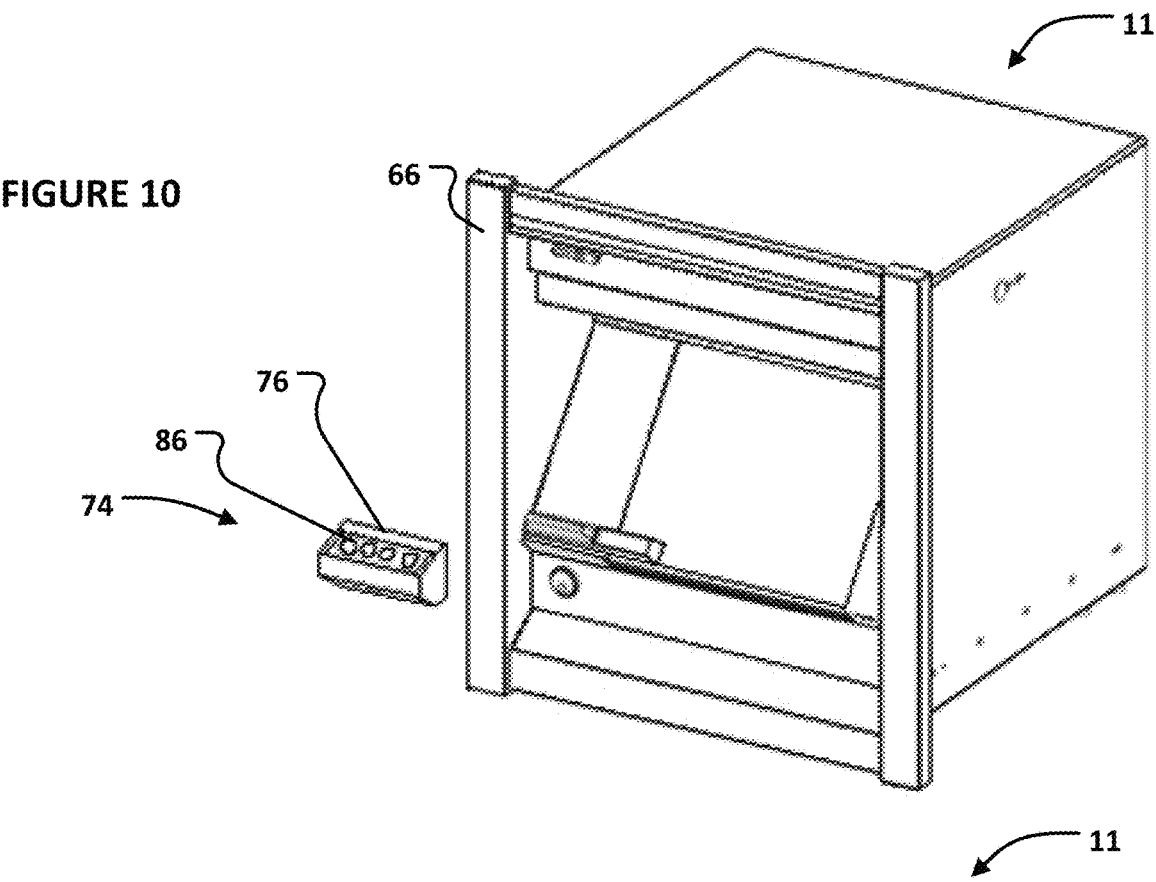
FIG. 10 is an isometric view of the exemplary AHD, showing a fascia and a user-interface assembly of the exemplary AHD.
Figure 11:
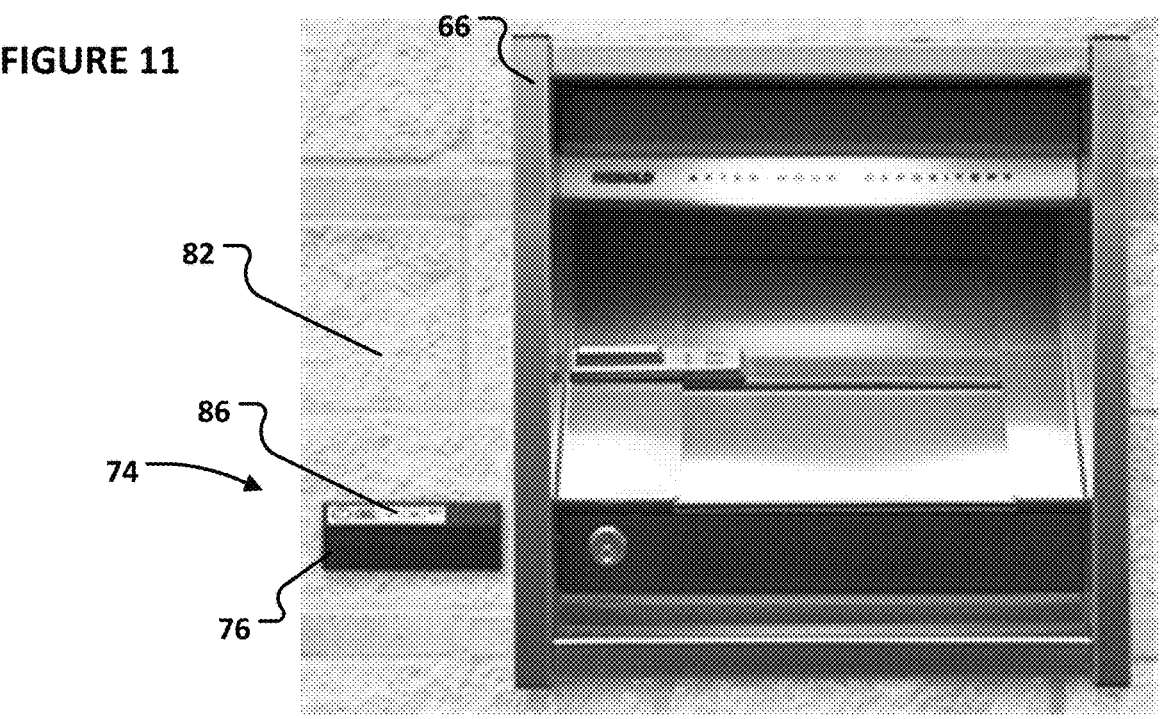
FIG. 11 is a front view of the exemplary AHD, showing the fascia and the user-interface assembly of the exemplary AHD.
Figure 12:
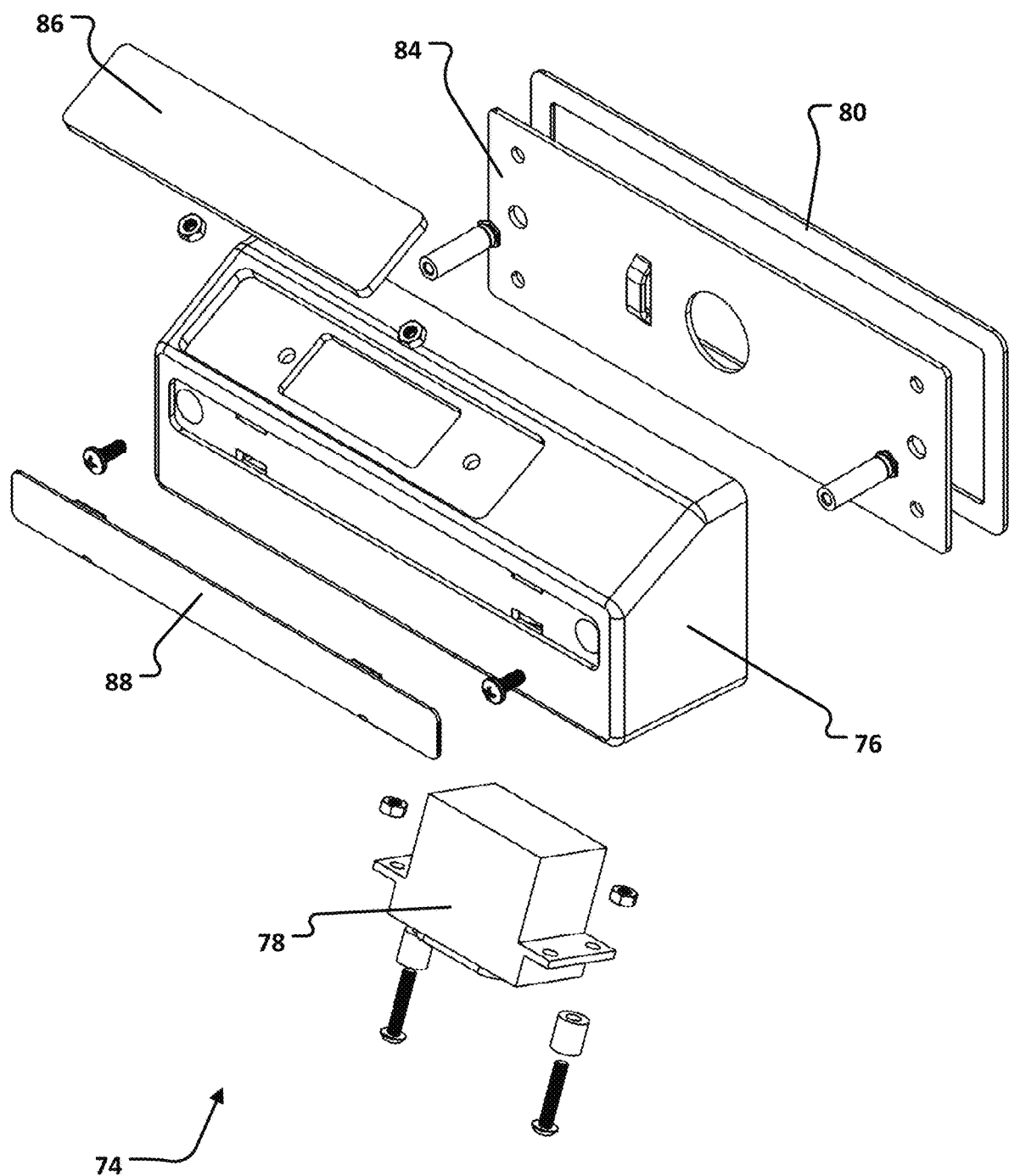
FIG. 12 is an exploded view of the exemplary user-interface assembly of the exemplary AHD.
Figure 13:
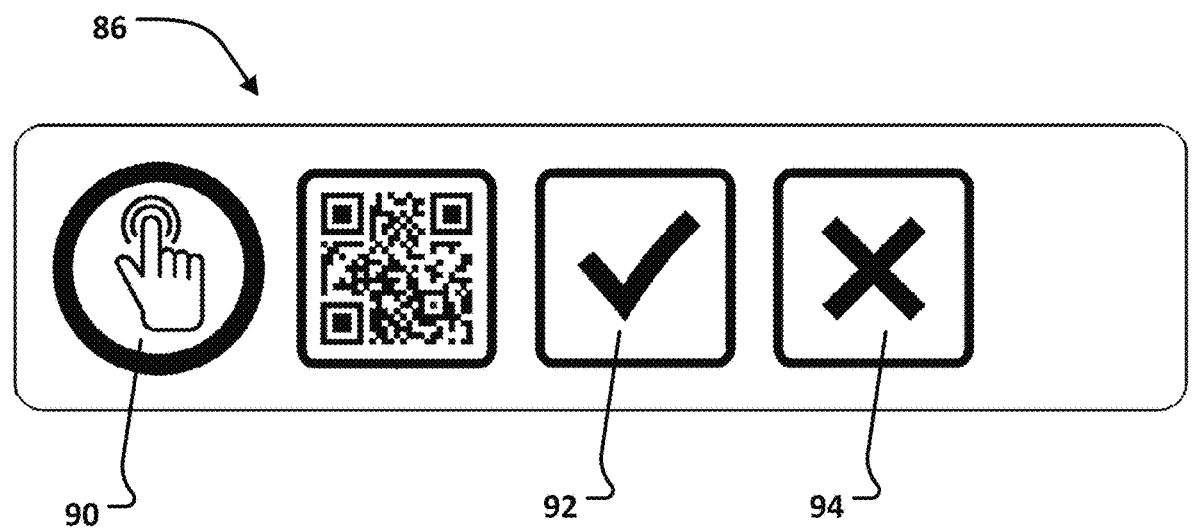
FIG. 13 is a front view of a plate of the exemplary user-interface assembly.

FIGS. 10-14 disclose further features of the present disclosure. The exemplary AHD 11 also includes a user-interface assembly 74. The exemplary user-interface assembly 74 includes a housing 76. The exemplary housing 76 can be mounted adjacent to the fascia 66, as shown in FIGS. 10 and 11. The exemplary user-interface assembly 74 of the exemplary AHD 11 also includes a scanner 78 contained in the exemplary housing 76. As best shown in FIG. 12, the exemplary user-interface assembly 74 also includes a backing plate 80 that would be positioned against a wall 82 upon which the exemplary user-interface assembly 74 is mounted, a seal 84 positioned between the exemplary backing plate 80 and the exemplary housing 76, and plates 86, 88 mountable on the exemplary housing 76. The plates 86, 88 can be utilized to bear indicia, including visual and tactile indicia.

The exemplary user-interface assembly 74 includes a push button 90 communicating with the third computing device 14. The visible portion of the exemplary push button 90 is referenced in FIG. 13. The exemplary push button 90 communicates a signal to the third computing device 14 when pressed.

The exemplary user-interface assembly 74 also includes a first indicator 92 configured to emit light when activated. The visible portion of the exemplary first indicator 92 is referenced in FIG. 13. The exemplary user-interface assembly 74 also includes a second indicator 94 configured to emit light when activated. The visible portion of the exemplary second indicator 94 is referenced in FIG. 13.

The exemplary AHD 11 also includes a first sensor 96 positioned and configured to monitor an interior of the chute 68 for passage of the bag through the chute 68. The first sensor 96 is shown schematically and referenced in FIG. 3. The first sensor 96 can be a proximity sensor, a light curtain sensor, or some other kind of sensor. The first sensor 96 can communicate with the controller 54 through the transceiver 60. The exemplary AHD 11 also includes at least one second sensor positioned and configured to monitor the door 46 in both the open position and the closed position. The second sensor can be a unitary sensor that is configured to sense both the open and closed positions, or can be a pair of sensors one for each of the open and closed positions. In the exemplary embodiment, the second sensor is embodied by the sensor 64.

The exemplary first sensor 96 can be configured to emit a first signal in response to detection of passage of the bag through the chute 68. The exemplary second sensor 64 can be configured to emit a second signal in response to detection of the door 46 at the open position and emit a third signal in response to detection of the door 46 at the closed position. The exemplary third computing device 14 can be configured to generate a message to the second computing device 18 in response to receiving the second signal and the third signal without also receiving the first signal. This can occur if the depositor opens and closed the door 46 but does not drop the bag into the chute 68.

Figure 14:
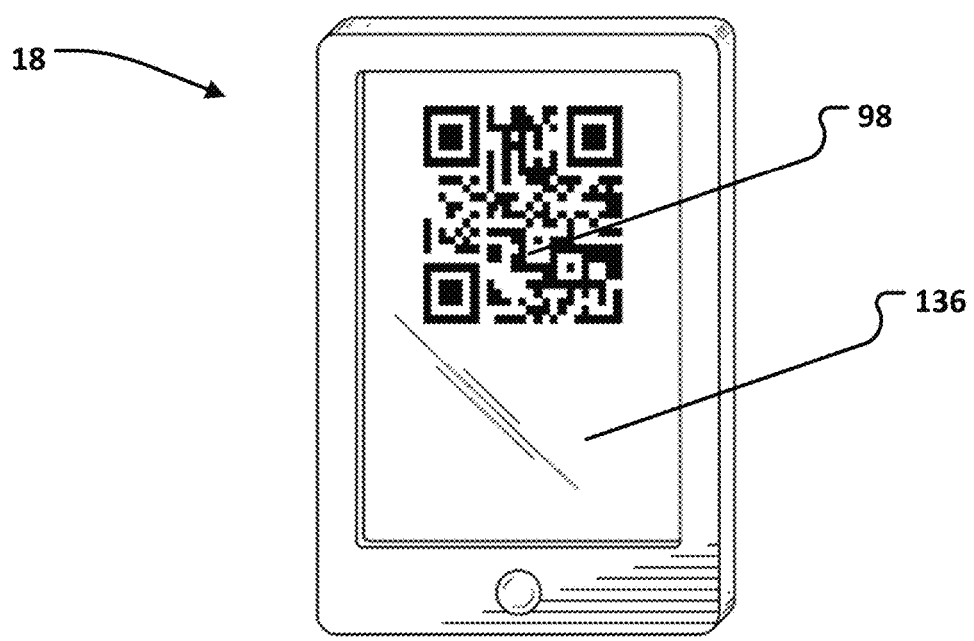
FIG. 14 is an isometric view of a secondary computing device displaying a scannable token.

As set forth above, the exemplary first computing device 12 can receive a first input from the second computing device 18 and the first input can define a pre-staged transaction and include details of a deposit of the bag. In one or more embodiments of the present disclosure, in response to receipt of the first input, the first computing device 12 can generate a scannable token. The scannable token can be correlated to the first input and can be communicated to the second computing device 18. The scannable token may or may not be correlated to the AHD 11. FIG. 14 shows the exemplary second computing device 18 displaying an exemplary scannable token 98 on a display of the exemplary second computing device 18.

In operation, when a user/depositor arrives at the AHD 11, the user can press the push button 90. The exemplary third computing device 14 is configured to activate the scanner 78 in response to receiving the signal from the push button 90. The exemplary scanner 78 can then attempt to scan the scannable token 98 from the display 136 of the second computing device 18; The exemplary scanner 78 is configured to scan the scannable token 98 from a display of the second computing device 18. The user can position the display 136 under the scanner 78. The scanner 78 can be configured to communicate the scanned token to the third computing device 14.

If the scan is successful, the third computing device 14 is configured to activate the first indicator 92 in response to receiving the scanned token from the scanner 78. This provides an indication to the user that the token 98 has been scanned. The exemplary scanner 78 is further configured to transmit an error message to the third computing device 14 when the scannable token 98 has not been scanned. The third computing device 14 is configured to activate the second indicator 94 in response to receiving the error message from the scanner 78. The user can then present the display 136 to the scanner 78 again.

When the exemplary third computing device 14 receives the scanned token from the scanner 78, the third computing device 14 can control the actuator 58 to switch the lock 48 from the first configuration to the second configuration, thus unlocking the door 46. The chute 68, through the inlet 40, can then receive the bag from the user. The exemplary chute 68 then guides movement of the bag from the door 46 to the safe 44.

It is noted that in one or more embodiments of the present disclosure, the third computing device 14 can control the actuator 58 to switch the lock 48 based only on the scanned token and not upon approval of switching the lock from the first configuration to the second configuration by the first computing device 12. In other words, the data contained in the token 94 can be sufficient for the AHD 11 to open the door 46 without seeking approval from the first computing device 12.

It is noted that in one or more embodiments of the present disclosure, the third computing device 14 can generate two confirmation messages in response to the receiving the bag through the inlet 40 of the chute 68 of the AHD 11. The exemplary third computing device 14 can generate a first message by electronically transmitting a confirmation messages as one of a text message and electronic mail message. The exemplary third computing device 14 can generate a second message by printing, with a printer 138 of the AHD 11, a second of the two confirmation messages. In one or more other embodiments of the present disclosure, the second message can also be transmitted electronically. This second confirmation message can be desirable when the deposit is against an account held by a business and an employee of the business is making the deposit. The employee can thus possess confirmation that the deposit occurred.

It is noted that in one or more embodiments of the present disclosure, the system 10 can also be configured such that scannable tokens can be used after being transferred. The first computing device 12 can receive a second input (analogous to the first input) from a fourth computing device (analogous to the second computing device 18). The fourth computing device can be remote from the first computing device 12 and possessed by a second user. The second input can define a second pre-staged transaction and including details of a deposit of a second bag containing currency or bank checks. The exemplary first computing device 12 can generate a second scannable token in response to the receiving the second input and communicate the second scannable token to the fourth computing device. The second user can then transfer the second scannable token, for example to a subordinate or employee. The second scannable token could be transferred by text message or email. The scanner 78 could then scan the second scannable token from a display of a fifth computing device (the device of the subordinate or employee).

It is noted that in one or more embodiments of the present disclosure, the exemplary first computing device 12 can generate a scannable token 98 that is not correlated to an input received from the second computing device 18 and communicate such a scannable token to the second computing device 18. Such a "universal" scannable token could be used by the user to make deposits when (1) the deposit is not pre-staged and (2) the user lacks the key 50. A universal token can be correlated to the user.

The exemplary AHD 11 and system 10 provide an intuitive, easy-to-use interface for bag deposit transactions. Pre-stage AHD transactions can be accomplished with increased efficiency. The exemplary system 10 can allow bulk deposit drops with nothing more than a QR code in one or more embodiments of the present disclosure. The exemplary system 10 can provide proof of deposit w/electronic receipt (to merchants and the individual performing the drop). Financial institutions will have the option for provisional credit for deposits made through the system 10.

In addition, the system 10 can facilitate scheduling of the AHD bag sweep and count during down time. Employees of the financial institution can know what is in the AHD 11 to schedule a pick up. In the exemplary embodiment, the AHD 11 includes a receipt printer 150, which is referenced in FIG. 3. The receipt printer 150 can communicate with the controller 54 and the first computing device 12. The exemplary receipt printer 150 is mounted adjacent to the door and faces the rear of the AHD 11. When the outlet door 42 is opened, the receipt printer 150 can print a list of all bags deposited in the AHD 11 since the last opening of the outlet door 42. The list can set forth each bag, the account holder of each bag, and the amount of the deposit in each bag. It is noted that the receipt printer 150 can print a paper receipt. In one or more other embodiments of the present disclosure, the controller 54 can transmit an electronic file containing the data of the deposits. This file can be transmitted to a mobile computing device of the person who removes the contents of the safe 44, personnel of the bank branch at which the AHD 11 is located, and/or the first computing device 12.

Further, the financial institution can move to a more online reconciling process. The exemplary system 10 facilitates easier activity reporting, including the number of transactions per AHD (Daily, Weekly, Monthly trends) and a dollar value summary per AHD (Daily, Weekly, Monthly trends). Portions of the system, especially the user interface assembly 74, are retrofitable into an AHD or included with a new head.

The exemplary system 10 can provide financial institutions a solution focused at the merchant customer, providing the merchant the ability to pre-stage AHD transactions for increased efficiency and transaction visibility, allowing for keyless drops with nothing more than a bag/envelop, providing proof of deposit in an electronic receipt showing a deposit location map with multiple e-mail addresses, allowing for provisional credit for deposits, reducing cost by eliminating managing merchant keys, and optimizing staff processes of reconciling AHD deposits during down times of the day or scheduled Cash In Transit pick up.

The exemplary system 10 provides further benefits. The exemplary system 10 can provide financial institutions a solution that retrofits into 95% of the AHD install base. The exemplary AHD 11 has a smaller footprint then existing models, while being compliant (5 lb pull and 5 lb push). Retrofit installation would be relatively easy. The AHD 11 can also function with automatic unlocking for pre-staged drops, with a key override for non-pre-staged bag drops.

While the present disclosure has been described with reference to an exemplary embodiment, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the appended claims. The right to claim elements and/or sub-combinations that are disclosed herein is hereby unconditionally reserved. The use of the word "can" in this document is not an assertion that the subject preceding the word is unimportant or unnecessary or "not critical" relative to anything else in this document. The word "can" is used herein in a positive and affirming sense and no other motive should be presumed. More than one "invention" may be disclosed in the present disclosure; an "invention" is defined by the content of a patent claim and not by the content of a detailed description of an embodiment of an invention.

What is claimed is:

1. A method for intaking a bag containing currency or bank checks comprising:
   receiving, at a first computing device having one or more processors, a first input from a second computing device, the second computing device remote from the first computing device and possessed by a user, the first input defining a pre-staged transaction and including details of a deposit of the bag;
   generating, with the first computing device, a scannable token in response to said receiving, the scannable token correlated to the first input;
   communicating, with the first computing device, the scannable token to the second computing device;
   scanning, with a scanner at an after-hours depository (AHD), the scannable token from a display of the second computing device;
   receiving, by a third computing device having one or more processors at the AHD, from the scanner, the scanned token;
   locking a door of the AHD with a lock that is operably associated with the door and configurable in a first configuration wherein the door is locked in a closed position and the lock also configurable in a second configuration wherein the door is unrestrained from moving to an open position from the closed position;
   controlling, with the third computing device, an actuator to switch the lock from the first configuration to the second configuration, said controlling in response to said scanning;
   receiving, after said controlling, the bag through an inlet of a chute of the AHD that extends between the door and a safe of the AHD, the chute guiding movement of the bag from the door to the safe;
   receiving, at the first computing device, a second input from a fourth computing device, the fourth computing device remote from the first computing device and possessed by a second user, the second input defining a second pre-staged transaction and including details of a deposit of a second bag containing currency or bank checks;
   generating, with the first computing device, a second scannable token in response to said receiving the second input;
   communicating, with the first computing device, the second scannable token to the fourth computing device; and
   scanning, with the scanner at the AHD, the second scannable token from a display of a fifth computing device remote from the first computing device.

2. The method of claim 1 wherein said controlling the actuator to switch the lock from the first configuration to the second configuration with the third computing device is further defined as:
   controlling, with the third computing device, the actuator to switch the lock from the first configuration to the second configuration, said controlling in response to receiving the scanned token from said scanner, said controlling not based on upon approval of switching the lock from the first configuration to the second configuration by the first computing device.

3. The method of claim 1 further comprising:
   positioning a physical identifier on the AHD, the physical identifier including indicia that distinguishes the AHD from other AHDs and is scannable; and
   receiving, at the first computing device having one or more processors, a second input indicating that the indicia has been scanned.

4. A method for intaking a bag containing currency or bank checks comprising:
   receiving, at a first computing device having one or more processors, a first input from a second computing device, the second computing device remote from the first computing device and possessed by a user, the first input defining a pre-staged transaction and including details of a deposit of the bag;
   generating, with the first computing device, a scannable token in response to said receiving, the scannable token correlated to the first input;
   communicating, with the first computing device, the scannable token to the second computing device;
   scanning, with a scanner at an after-hours depository (AHD), the scannable token from a display of the second computing device;
   receiving, by a third computing device having one or more processors at the AHD, from the scanner, the scanned token;
   locking a door of the AHD with a lock that is operably associated with the door and configurable in a first configuration wherein the door is locked in a closed position and the lock also configurable in a second configuration wherein the door is unrestrained from moving to an open position from the closed position;

controlling, with the third computing device, an actuator to switch the lock from the first configuration to the second configuration, said controlling in response to said scanning;

receiving, after said controlling, the bag through an inlet of a chute of the AHD that extends between the door and a safe of the AHD, the chute guiding movement of the bag from the door to the safe;

generating, with the first computing device, a second scannable token that is not correlated to an input received from the second computing device; and communicating, with the first computing device, the second scannable token to the second computing device; and scanning, with the scanner at the AHD, the second scannable token from a display of a fourth computing device remote from the first computing device.

5. The method of claim 4 further comprising:

monitoring the door in both the open position and the closed position with at least one first sensor;

emitting, with the at least one first sensor, a first signal in response to detection of the door at the open position; and emitting, with the at least one first sensor, a second signal in response to detection of the door at the closed position.

6. The method of claim 5 further comprising:

monitoring for passage of the bag through the chute with a second sensor;

emitting, with the second sensor, a third signal in response to detection of passage of the bag; and generating, with the third computing device, a message to said second computing device in response to receiving the first signal and the second signal without also receiving the third signal.

7. The method of claim 4 wherein the scannable token is not correlated to the AHD.

8. The method of claim 4 further comprising:

receiving, at the first computing device, a second input from the second computing device substantially concurrent with the first input, the second input indicating a current location of the second computing device;

determining, at the first computing device, one or more locations of AHDs proximate to the current location; and transmitting, with the first computing device, a message to the second computing device, the message including the one or more locations of AHDs.

* * * * *